(No Model.)

J. STEPHENS.
JOURNAL BEARING.

No. 537,131. Patented Apr. 9, 1895.

Witnesses
C. J. Williamson
A. L. Hough

Inventor
Joseph Stephens,
by Franklin H. Hough,
Atty.

United States Patent Office.

JOSEPH STEPHENS, OF FOREST CITY, PENNSYLVANIA.

JOURNAL-BEARING.

SPECIFICATION forming part of Letters Patent No. 537,131, dated April 9, 1895.

Application filed January 11, 1895. Serial No. 534,576. (No model.)

*To all whom it may concern:*

Be it known that I, JOSEPH STEPHENS, a citizen of the United States, residing at Forest City, in the county of Susquehanna and State of Pennsylvania, have invented certain new and useful Improvements in Journal-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in journal bearings for car wheels, and especially to improved bearings for car wheels used in connection with miners' carts, and the object of the invention is to produce a hollow stub bearing for each wheel, having interposed between each journal bearing a stub axle which has an end securely held to each bearing, and so arranged that in case of any breakage to the bearings or wheels, the various parts may be readily detached and parts interchanged.

A further object of the invention resides in the provision of a hollow bearing on which the wheel is designed to turn, which bearing is provided with a plurality of perforations through which oil may freely run to lubricate the bearing surface, and the construction of a short axle having shoulders at suitable distances from its ends, which are adapted to hold the wheel to its bearing when the parts are assembled and held to the truck of a car.

To these ends and to such others as the invention may pertain, the same consists further in the novel construction, combination and adaptation of the parts as will hereinafter more fully appear, and then be specifically defined in the appended claim.

I clearly illustrate my invention in the accompanying drawings, which with the letters of reference marked thereon form a part of this specification, and in which drawings—

Figure 1:
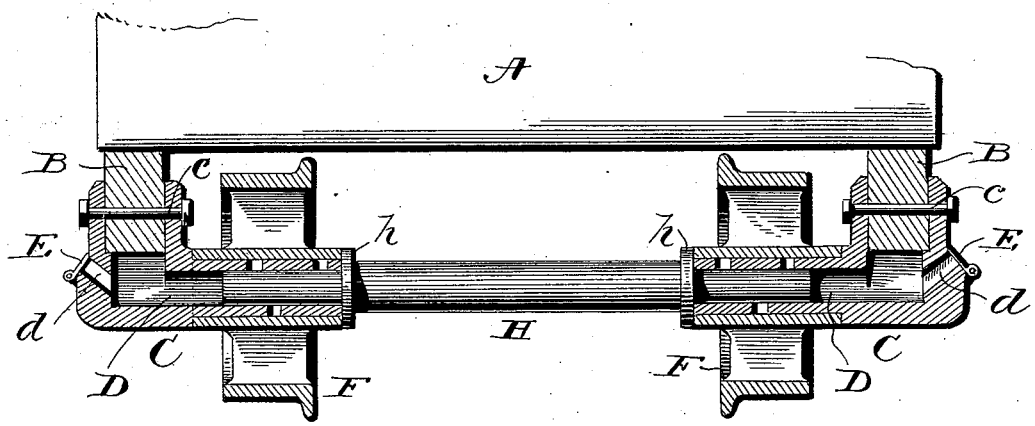
Figure 2:
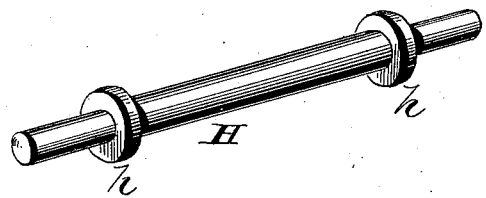
Figure 3:
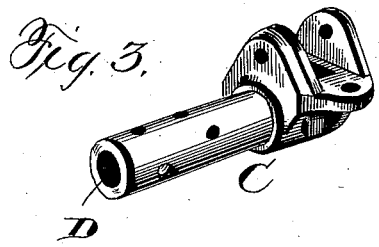

Figure 1 is a vertical sectional view through the axle and sill and bearings. Fig. 2 is a perspective view of the axle. Fig. 3 is a detailed view of the hollow journal and oil receptacle.

Reference now being had to details of the drawings by letter, A designates a truck of a car; B, the sills to which are bolted the journal bearings C by means of bolts c. The said journal bearings are hollow, as seen at D, and are provided with a plurality of apertures about the said bearings, through which oil is adapted to run to lubricate the bearing surface. The outer end of said bearing is provided with an inner perforation d through which oil is supplied to the interior of the perforated bearing, and a suitable lid E is provided to cover the said oil inlet.

F is a flanged wheel of ordinary construction which is adapted to be journaled on the end of the perforated bearing.

H is a short stub axle provided with the shoulders h, which are disposed at a suitable distance from each end, the said ends being designed to telescope within the inner ends of the perforated bearings after the wheels have been hung on the bearings. The shoulders h are designed to hold the wheels in place when the parts are assembled ready for use in connection with the truck of the car.

By my improved construction of journal bearings, it will be seen that the various parts are interchangeable, and in case of any breakage of the wheel, one of the bearings on one side may be readily detached and the broken part easily and quickly replaced.

My invention is adapted especially for use in connection with miners' cars, where the facilities for repairing are limited and where in case any of the parts are broken, they may be readily replaced without the necessity of transporting the truck to a machine shop, as would be the case were the wheels secured to the axles by hydraulic pressure.

The various parts of this invention are assembled together for use as follows: First, one of the hollow bearings is bolted to a sill of the car. The wheel is then adjusted to its outer circumference, one end of the stub axle being inserted within the inner end of the bearing, and then the opposite bearing is adjusted with a wheel, its inner end inserted on the end of said stub axle, and then the said bearing is bolted to the sill on the opposite side of the truck, and the device is ready for use.

Having thus described my invention, what I claim to be new, and desire to secure by Letters Patent, is—

In combination the hollow bearings C and C perforated about their circumferences, the recessed portions designed to receive the sills B, pin $c$ for holding same thereto, the stub axle, H, having shoulders $h$ which are adapted to abut against the free ends of the bearings C and C and the wheels F, all substantially as shown and described.

In testimony whereof I affix my signature in presence of two witnesses.

JOSEPH STEPHENS.

Witnesses:
   WILLIAM ANDERSON,
   EDWIN BOUCHER.